United States Patent [19]
Batheja et al.

[11] Patent Number: 4,789,518
[45] Date of Patent: Dec. 6, 1988

[54] LIQUID-COOLED NUCLEAR REACTOR ESPECIALLY A BOILING-WATER REACTOR

[75] Inventors: Pramod Batheja; Claus Goetzmann, both of Erlangen; Hermann Kumpf, Wendelstein; Peter Rau, Leutenbach, all of Fed. Rep. of Germany

[73] Assignee: Kraftwerk Union Aktiengesellschaft, Mulheim am Rhein, Fed. Rep. of Germany

[21] Appl. No.: 5,289

[22] Filed: Jan. 16, 1987

Related U.S. Application Data

[63] Continuation of Ser. No. 722,306, Apr. 11, 1985, abandoned.

[30] Foreign Application Priority Data

Dec. 13, 1983 [DE] Fed. Rep. of Germany .. 3345099.4

[51] Int. Cl.$^4$ .............................................. G21C 1/04
[52] U.S. Cl. ...................................... 376/353; 376/448
[58] Field of Search ............... 376/178, 303, 352, 353, 376/362, 370, 371, 373, 374, 406, 448, 449

[56] References Cited

U.S. PATENT DOCUMENTS

| | | | |
|---|---|---|---|
| 3,036,964 | 5/1962 | Horning | 376/370 |
| 3,101,309 | 8/1963 | Groh | 376/448 |
| 3,330,734 | 7/1967 | Ashcroft et al. | 376/353 |
| 3,809,610 | 5/1974 | Smith et al. | 376/448 |
| 3,879,259 | 4/1975 | Persson et al. | 376/362 |
| 3,979,257 | 9/1976 | Knodler et al. | 376/353 |
| 4,142,934 | 3/1979 | Wild | 376/448 |
| 4,306,938 | 12/1981 | Yamanaka | 376/448 |
| 4,348,355 | 9/1982 | Nylund | 376/448 |
| 4,514,358 | 4/1985 | Borrman et al. | 376/448 |

OTHER PUBLICATIONS

"VGB Kernkraftwerks-Seminar 1970", p. 89.

Primary Examiner—Charles T. Jordan
Assistant Examiner—Richard Klein
Attorney, Agent, or Firm—Herbert L. Lerner; Laurence A. Greenberg

[57] ABSTRACT

Liquid-cooled nuclear reactor having a reactor pressure vessel and a reactor core of fuel assemblies received therein, the fuel assemblies being grouped into core cells each having a control rod containing absorber material and connected to a drive mechanism, including a sheetmetal shaft associated with the core cells, respectively, and extending beyond the length of the reactor core by a length at least equal to that of the respective control rod and having a cross section substantially equal to that of the respective core cell, the sheetmetal shaft being formed with longitudinal channels through which the fuel assemblies are loadable and unloadable.

5 Claims, 5 Drawing Sheets

U.S. Patent  Dec. 6, 1988  Sheet 2 of 5  4,789,518
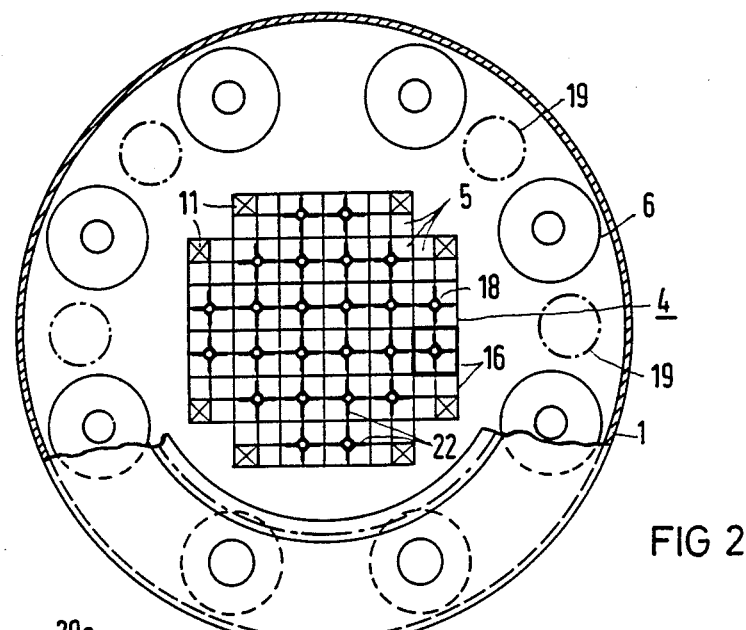
FIG 2
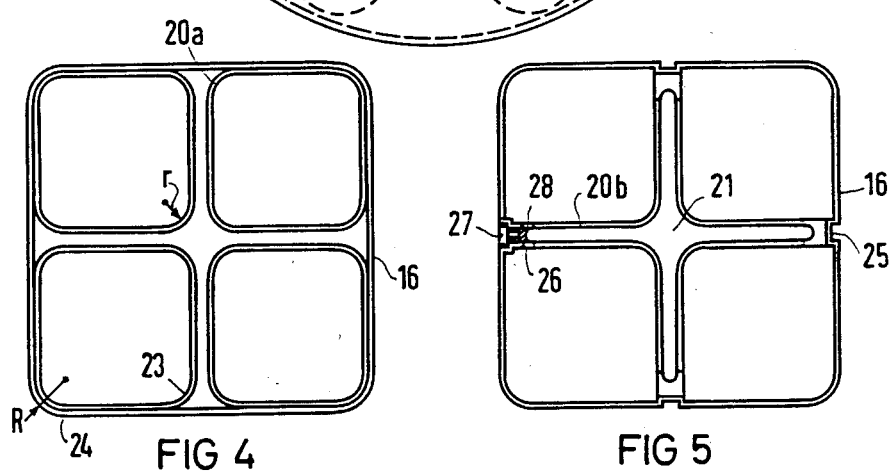
FIG 4
FIG 5
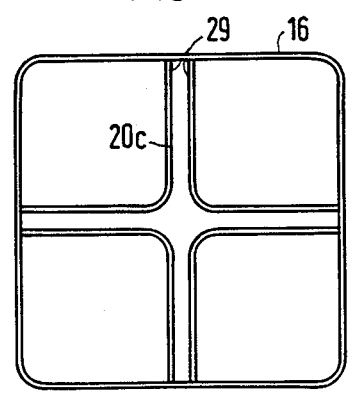
FIG 6
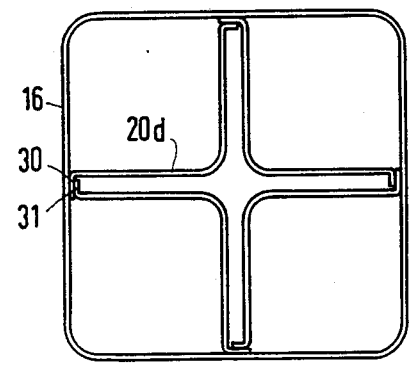
FIG 7

LIQUID-COOLED NUCLEAR REACTOR ESPECIALLY A BOILING-WATER REACTOR

This application is a continuation of application Ser. No. 722,306, filed Apr. 11, 1985, now abandoned.

The invention relates to a liquid-cooled nuclear reactor, especially a boiling-water reactor and, more particularly, to such a reactor having a reactor pressure vessel and a reactor core of fuel assemblies received therein, the fuel assemblies being grouped into core cells each having a control rod containing absorber material and connected to a drive mechanism.

Such a nuclear reactor is described on page 89 in the book "VGB Kernkraftwerks-Seminar 1970". The fuel assemblies enclosed by the casing are inserted individually into a core grid, by which they are fixed at the top and bottom. Guides for the control rods are connected to the core grid. Because these guides are at least equal in length to that of the control rod and are thus approximately as long as the height of the core, the heretofore known structure must be made very strong and stable in view of earthquake forces and the processing by machine and, thereby, quite costly. In addition, those internals which are arranged above the fuel assemblies must be disassembled before the loading process and must be stored under water which requires much space and expensive pits.

It is accordingly an object of the invention to simplify and economize on the construction and the loading process by employing a different type of construction for a liquid-cooled nuclear reactor.

With the foregoing and other objects in view, there is provided, in accordance with the invention, a liquid-cooled nuclear reactor having a reactor pressure vessel and a reactor core of fuel assemblies received therein, the fuel assemblies being grouped into core cells each having a control rod containing absorber material and connected to a drive mechanism, including a sheetmetal shaft associated with the core cells, respectively, and extending beyond the length of the reactor core by a length at least equal to that of the respective control rod and having a cross section substantially equal to that of the respective core cell, the sheetmetal shaft being formed with longitudinal channels through which the fuel assemblies are loadable and unloadable.

With the sheetmetal well or shaft according to the invention, the fuel assemblies forming the core cells can be fixed without requiring an upper core grid. The sheetmetal wells or shafts, in this regard, however, are only simple parts having very little weight, as indicated hereinafter in a more detailed description of exemplary embodiments. Nevertheless, the sheetmetal wells or shafts can serve not only for reliable fixation of the fuel assemblies but also for guiding the control rod. Additionally, the sheetmetal wells or shafts have the effect of reinforcing coolant flow through the fuel assemblies by a chimney effect. The invention is therefore particularly well suited for boiling-water reactors with natural circulation, although a simplification of the core construction can be applied to advantage also in other liquid-cooled nuclear reactors.

In the interest of neutron economy, and in accordance with another feature of the invention, the sheetmetal shaft has a part thereof formed of a zirconium alloy in the region of the reactor core, and has a part thereof located above the first-mentioned part which is formed of stainless steel. It is also possible, however, to form the sheetmetal well or shaft of zirconium alloys over the entire length thereof in order to avoid a connection between the zirconium part and the steel part.

In accordance with a further feature of the invention, the sheetmetal shaft encloses the control-rod drive mechanism. This is of advantage particularly if the drive mechanism is so constructed that it engages the control rod directly by its drive elements and does not require any long intermediate members. For drives of great length, the sheetmetal well or shaft can at least support the control rod drive. In any case, the greater length required thereby can be advantageous also in view of the already aforementioned chimney effect.

In accordance with an added feature of the invention, the sheetmetal well or shaft furthermore serves for supporting a water separator such as is customary in boiling-water reactors. The possibility exists, in this regard, according to the invention, of providing a common water separator for the four fuel assemblies in a sheet metal or shaft, or of providing an individual water separator for each fuel assembly. In either case, according to the invention, the sheetmetal well or shaft encloses the water separator and is formed with an opening through which the separated water is discharged to the outside of the sheetmetal well or shaft. Assurance is thereby provided that the one-way upward coolant flow in the sheetmetal well or shaft is not impeded by returning water.

In accordance with yet another feature of the invention, the sheetmetal well or shaft is associated with fuel assemblies of current construction as an enclosure so that, at least in the case of boiling-water reactors, shafts having a casing or box are involved. However, more particularly in accordance with a further embodiment of the invention, the sheetmetal well or shaft, at least in vicinity of the reactor core, encloses intermediate metal sheets which subdivide the well or shaft cross section into cross subsections which are substantially equal in size to the respective fuel-assembly cross sections. The sheetmetal well or shaft thereby simultaneously forms one part of the box or casing which encloses the fuel assemblies and with which the coolant is kept in close contact with the fuel assembly, and the intermediate metal sheets form the other part.

In accordance with yet an additional feature of the invention, the intermediate metal sheets are cooperatively engageable with the control rod as a guide. They are preferably constructed as angles which are fastened by respective free ends of the legs thereof to the sheetmetal well or shaft.

In accordance with yet a further feature of the invention, the nuclear reactor includes projections disposed at given locations of the sheetmetal shafts for bracing the shafts against one another and against an enveloping wall or baffle of the nuclear core. Additional structural parts can thereby be dispensed with which otherwise would be employed for the configuration of the reactor core. The sheetmetal wells or shafts need then only to be secured by an external enclosure. Further in accordance with the invention, the projections are sliding shoes or pressure pads disposed on the outside of the sheetmetal wells or shafts for facilitating lifting the sheet metal wells or shafts. For protection, in accordance with the invention, the projections are arranged in the corner of the sheetmetal wells or shafts. However, they are also located in the middle region so that a given amount of stiffening or reinforcement is possible thereat.

In accordance with another feature of the invention there are provided, respective walls of mutually adjacent sheetmetal shafts define a gap therebetween, and a respective plate formed of neutron absorber material being guided in said gap. With such an absorber, the starting reactivity can be adjusted. Appropriate neutron absorber material is exemplified by boron sheets, boron-bearing glass plates or also suitable mixtures with gadolinium which, as is well known, serve as a burnable toxin or poison. These absorbers can be removed from the core in accordance with the requirements. Advantageously, they are therefore arranged in a readily releasable manner and, if necessary or desirable, also adjustably.

In accordance with concomitant features of the invention, the nuclear reactors according to the invention is constructed with a polygonal core-cross section. Generally, it would be based on a square because square fuel assembly cross sections are preferred; the cross section of the sheetmetal well or shaft is then also a square. In any event, spaces in the corners of the polygonal or square core-cross section are free of i.e. unoccupied by, any fuel assemblies. This facilitates reshuffling the fuel assemblies during reloading because the fuel assemblies to be reshuffled no longer have to be deposit in the fuel-assembly storage pit.

Other features which are considered as characteristic for the invention are set forth in the appended claims.

Although the invention is illustrated and described herein as embodied in liquid-cooled nuclear reactor, especially a boiling-water reactor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments wen read in connection with the accompanying drawing, in which:

FIG. 2 is a cross-sectional view of FIG. 1;

FIGS. 4 to 7 are enlarged fragmentary top plant views of FIG. 3 showing four different embodiments of sheetmetal wells of shafts forming part of the invention;

Figure 1:
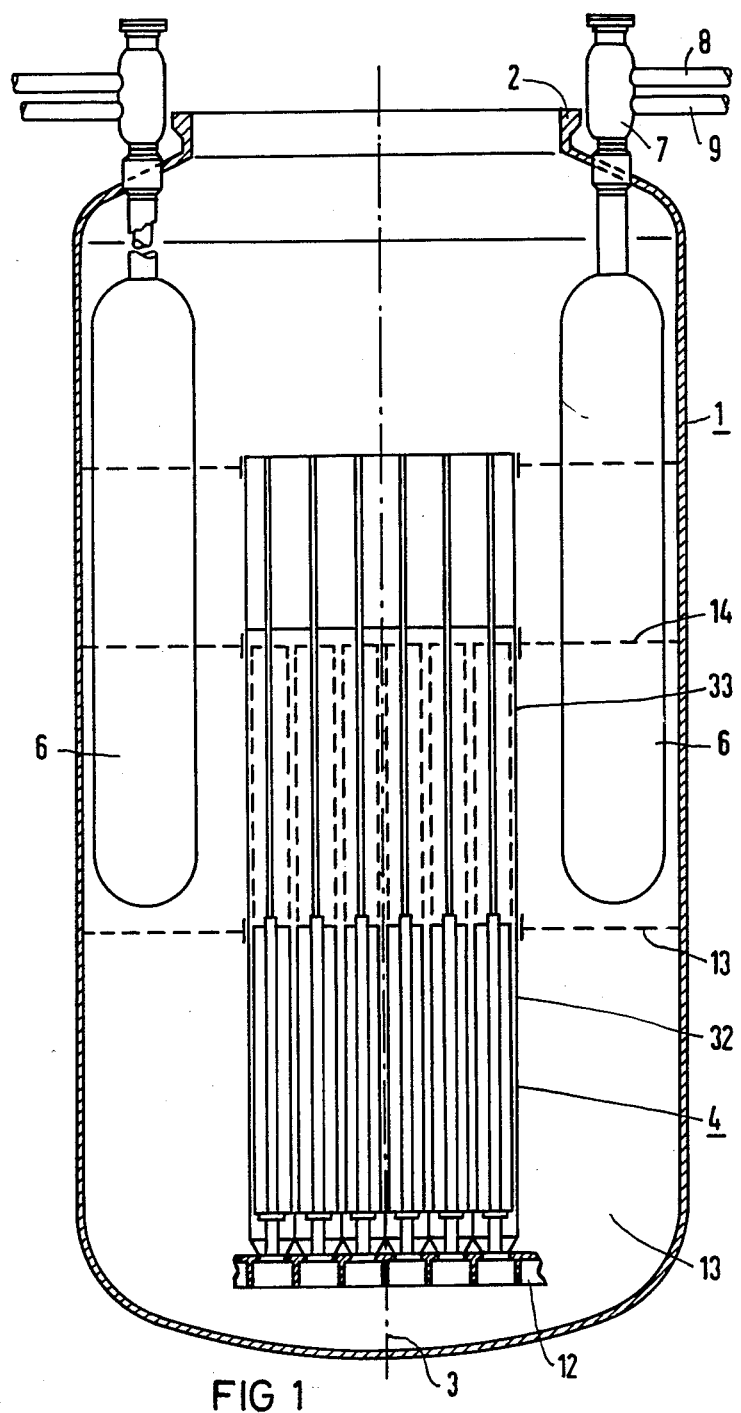
FIG. 1 is a diagrammatic vertical sectional view of a liquid-cooled nuclear reactor, such as a boiling-water reactor, according to the invention.

Referring now to the drawing and first, particularly, to FIGS. 1 and 2 thereof, there is shown a nuclear reactor which is a heating reactor operating as a boiling-water reactor and having approximately 100 MW of thermal output. The nuclear reactor has a substantially cylindrical reactrr pressure vessel 1, with a diameter of about 4 m, and a height from the bottom thereof to the upper edge of a cover flange 2 thereof of approximately 8 m. In a lower region thereof, the pressure vessel 1 contains a reactor core 4 in the vicinity of the vessel axis 3, the reactor core 4 being composed, in a conventional manner, of fuel assemblies 5 having an active length of 1.85 m and a square cross section.

The heat generated in the core 4 is removed by a reactor coolant (water of 200° C. and saturated steam at 15 bar) via eight heat exchangers 6 which are arranged above the reactor core 4 in vicinity of the wall of the reactor pressure vessel 1. The heat exchangers 6 are provided through the intermediary of a feedthrough 7 with two concentric tubes having a supply line 8 and a discharge line 9 for a secondary coolant which is pressurized water at 18 bar and having a temperature of 120° C. and 160° C., respectively.

The reactor core 4 is mounted on a lower support plate 12. Its lateral support is determined primarily by metal support sheets 13 and 14, shown as broken lines, which are otherwise not shown in detail but determine the polygonal contour of the core 4 as can be seen from FIG. 2. Within the contour, the core cross section is subdivided by sheetmetal shafts 16 which have a square cross section with a side or edge length of about 300 mm and enclose core cells 15 with four fuel assemblies 5, respectively. The fuel assembly positions 11 are unoccupied only at the corners of the reactor core 4.

Figure 3:
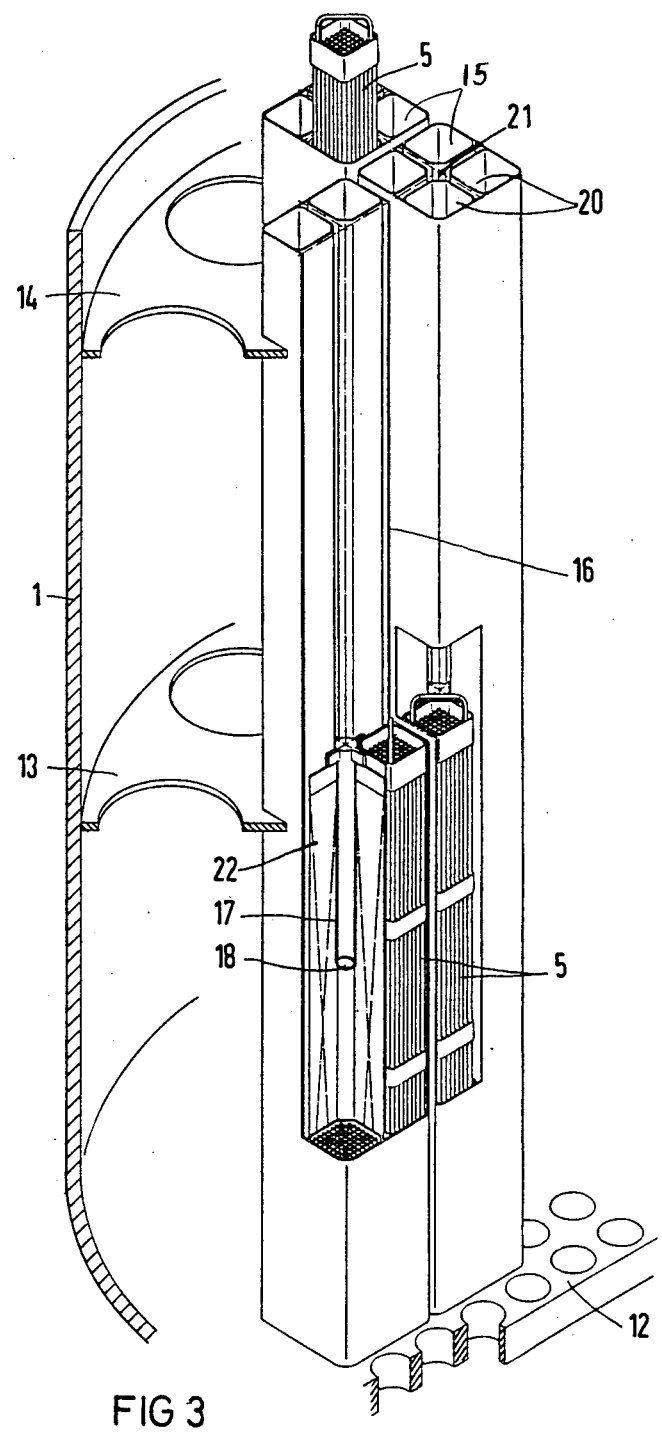
FIG. 3 is an enlarged fragmentary perspective view of FIG. 1.

The fuel assemblies 5, in turn, have a square cross section and are at the sheetmetal wells or shafts 16, with the outsides thereof facing towards the wells 16. As shown in FIG. 3, the other, inner sides of the fuel assemblies 5 rest against intermediate metal sheets 20 which are inserted into the sheetmetal wells or shafts 16. The intermediate metal sheets define a cross-shaped gap 21 for receiving therein control rods 22 and non-illustrated drive linkages and drives, respectively.

The cruciform control rods 22 which are associated with the core cells 15 and are enclosed by the sheetmetal shafts 16 are structurally integrated into the sheetmetal shafts 16. For this purpose, a cylinder 17 is provided in the middle of the gap 21 and has sliding therein a pressure-medium piston 18 which is connected to the control rod 22. The cooling water of the reactor, which is pressurized in vessels 19 between the heat exchangers 6 serves as the pressure medium. In the interest of greater clarity, the pressure lines have been omitted in Fig. 3.

In FIGS. 4 to 7, different possibilities for arranging the intermediate sheets 20 are shown which are differentiated by appended lower-case letters hereinafter. In FIG. 4, the intermediate sheets 20a are constructed as a square jacket or casing extending uniformly about the entire perimeter with rounded corners 23. The rounding radius r of the corners 23 is so chosen as to provide as closed a system as possible with the rounding radius R at the corners 24. The length of the sides of the square cross section of the jackets 20a is 140 mm, while the outer side length of the sheetmetal wells or shafts 16 is about 300 mm.

In the exemplary embodiment according to FIG. 5, the sheetmetal well or shaft 16 is indented in the middle region at 25. A solid connecting piece 26 is fastened thereat by a screw 27 which projects with two horn-like projections 28 into the center of the respective sheetmetal shaft 16. Angular pieces as intermediate metal sheets 20b, which separate the square cross sections provided for the fuel assemblies 5 from the central cross-shaped intermediate space 21, are welded to the projections 28.

In the exemplary embodiment according to FIG. 6, the rectangular intermediate metal sheets 20c are formed with somewhat longer legs. The free ends 29 of the legs abut the inside of the sheetmetal shaft or well 16 so that, not only a fastening, such as by welding or soldering, for example, but also a local insertion, is possible there.

In the exemplary embodiment according to FIG. 7, the angles 20d are provided on the legs thereof with angled-off tabs 30 and 31. The tabs 30 and 31 can be brought into contact with one another and with the sheetmetal shaft 16, and fastened by spot welding in a simultaneous welding operation.

The sheetmetal shafts 16 are formed of a zirconium alloy like the intermediate sheets 20 in the region of the reactor core 4, i.e. as a part 32 below the metal support sheet 13. The part 33 disposed thereabove can be made of stainless steel, however.

Figure 8:
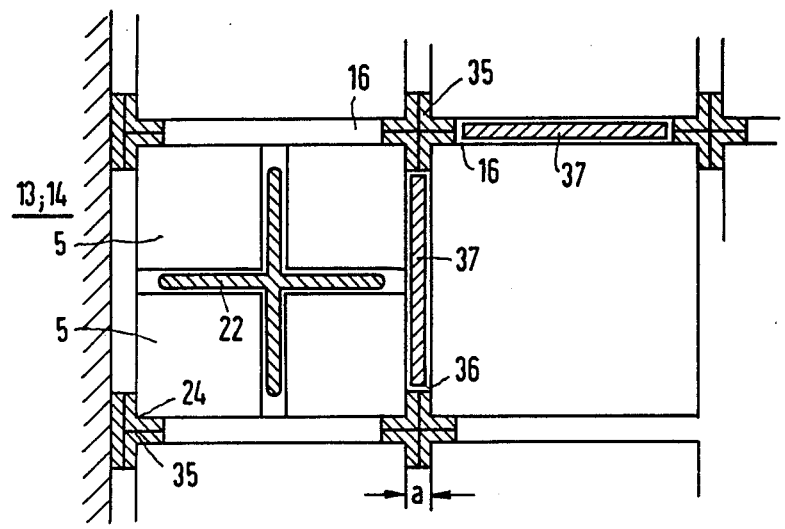
FIGS. 8 and 9 are diagrammatic plan views, partly in section, of mutually supported sheetmetal shafts with the disposition of additional absorber materials.

It is apparent in FIG. 8 that the sheetmetal shafts 16 are provided at the corners 24 thereof with angle pieces 35 which form projections and, as gliding shoes, effect mutual contact of adjacent sheetmetal shafts 16. The angle pieces 35 ensure a spacing a of about 10 mm between adjacent sheetmetal shafts 16. In accordance with nuclear-physical requirements, the intermediate space 36 contain, for example, an absorber, a special moderator or the like which is preferably inserted in the form of plates 37. If no inserts are required, the intermediate space 36 can also be made extremely small so that only little moderating water is present in the core 4.

Figure 9:
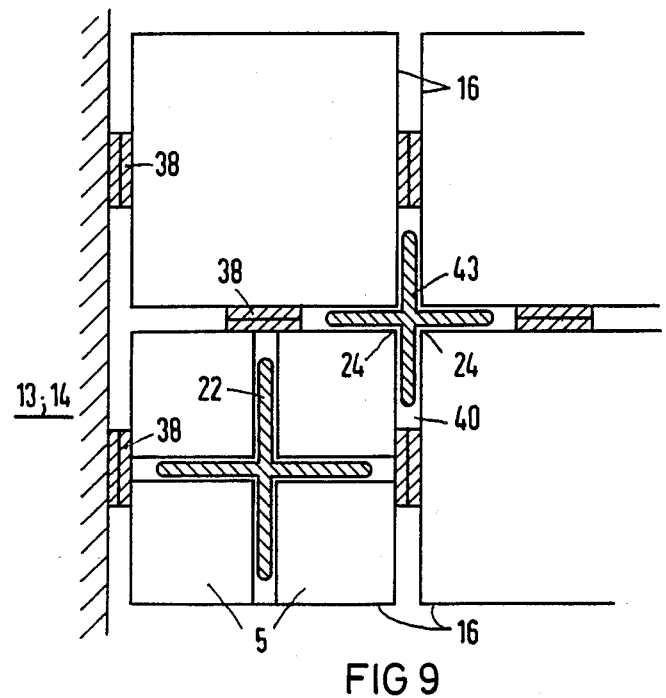

In the embodiment according to FIG. 9, the sheetmetal shafts 16 are supported against one another by flat, preferably beveled gliding shoes 38 which are attached in the middle of the walls of the shafts 16. Therefore, an empty intermediate space 40 with a cross-shaped cross section is produced in vicinity of the corners 24 of adjacent sheetmetal wells 16. A cruciform supplemental absorber 43 is accommodated in the cross-shaped space 40 between the sheetmetal shafts 16. If required, the supplemental absorber 43 can be arranged so as to be movable. At least withdrawal is possible if the core show a corresponding reduction of reactivity.

Figure 10:
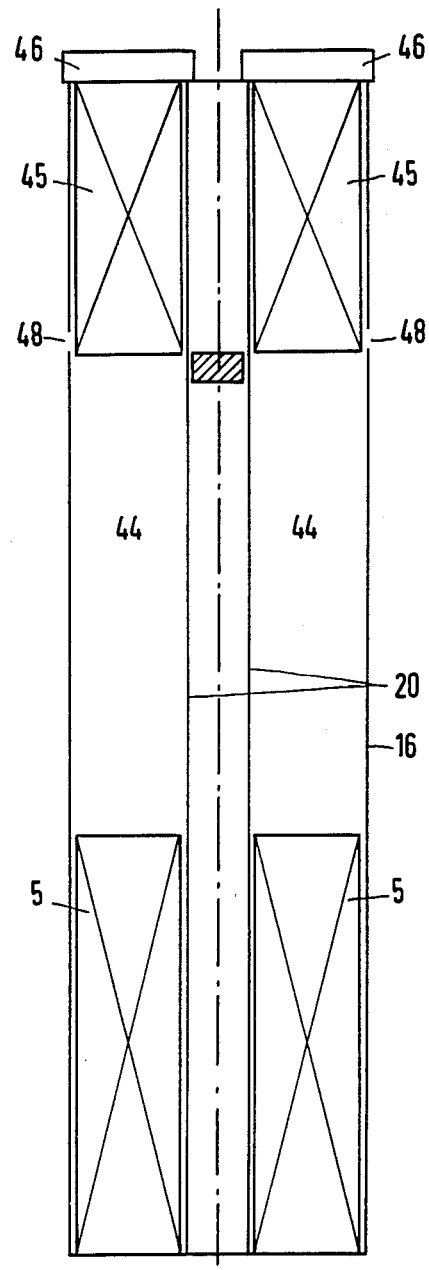
FIGS. 10 and 11 are diagrammatic longitudinal view of the sheetmetal shafts with water separators disposed therein or thereat.

The representation according to FIG. 10 shows, for a shortened sheetmetal well or shaft 16 in a vertical sectional view, that the fuel assemblies 5 are arranged at a lower end thereof. The fuel assemblies 5 are seated between the sheetmetal well or shaft 16 and the intermediate metal sheets 20 with enough play so that they can be moved, without the shafts 16, by a non-illustrated loading machine out of the reactor pressure vessel 1. The shafts 16 then form only channels 44 for each fuel assembly 5. It is merely necessary to free-up access which is blocked by water separators 45 which are supported by a support flange 46 at the upper end of the sheetmetal shafts 16. Each of the separators 45 is provided for the channel 44 containing a fuel assembly 5. An opening 48 which serves as a water outlet is provided in the sheetmetal shaft 16 at the underside of the separators 45. The separators 45 can be constructed, for example, as centrifugal separators.

Figure 11:
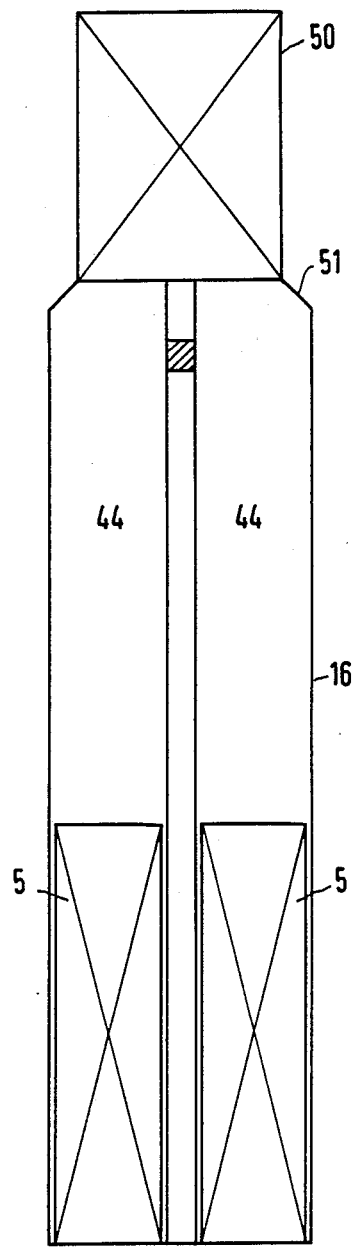

In the alternative embodiment shown in FIG. 11, a common separator 50 is provided in a sheetmetal well 16 for the four fuel assemblies 5. The common separator 50 has a cross section somewhat smaller than the cross section of the sheetmetal shaft 16. For this reason, the water eliminated at the lower end of the separator 50 runs over an incline 51 to the outside of the sheetmetal shaft 16. The incline 51 must be lifted off with the separator 50 so that the channels 44 are free for the withdrawal of a fuel assembly 5 represented in FIG. 3.

If the separators 45 and 50 are removed during fuel-assembly exchange in order to provide access to the fuel assemblies 5, the topmost part of the sheetmetal shafts 16 can also, for example, be removed because such a subdivision in the longitudinal direction may be of advantage with respect to the ease of handling of the sheetmetal shafts 16 and the accommodation of disposition thereof in a shielding water pit.

There is claimed:

1. Boiling-water reactor having a reactor pressure vessel and a reactor core of fuel assemblies received therein, the fuel assemblies being grouped into core cells each having a control rod containing absorber material and connected to a drive mechanism, comprising a plurality of sheetmetal shafts respectively associated with the core cells, each of said sheetmetal shafts extending beyond the length of the reactor core by a length at least equal to that of the respective control rod and having a cross section substantially equal to that of the respective core cell, intermediate metal sheets subdividing said sheetmetal shaft into longitudinal channels through which the fuel assemblies are loadable and unloadable, said channels having respective cross-subsections each substantially equal in size to the cross section of a respective fuel assembly, each of said sheet metal shafts enclosing and carrying the drive mechanism for the respective control rod, and the respective control rod being guidable on and along said intermediate metal sheets, and said sheetmetal shafts having mutually adjacent sides, and means attached to the outside of said sheetmetal shafts through which said sheetmetal shafts are braced against one another and against a core enclosure.

2. Boiling-water reactor according to claim 1, wherein said intermediate metal sheets are formed as angles having legs with respective free ends by which said angles are fastened to said sheetmetal shafts.

3. Boiling-water reactor according to claim 1, wherein the nuclear-core cross section is polygonal, and corner spaces of the polygonal cross section are free of fuel assemblies.

4. Boiling-water reactor according to claim 1 wherein said means are respective gliding shoes attached to said sides of said sheetmetal shafts at the middle thereof.

5. Boiling-water reactor according to claim 1 wherein said means are corner projections attached to said sides of said sheetmetal shafts at respective corners of said sheetmetal shafts.

* * * * *